Jan. 9, 1968   R. M. CHRISTENSON ET AL   3,362,844
METHYL METHACRYLATE COATING SYSTEM FOR METAL
Filed April 8, 1964
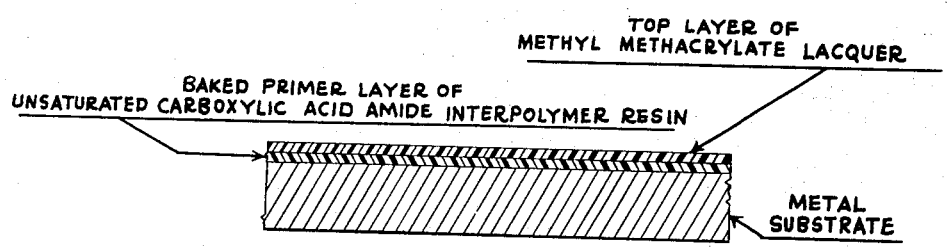
INVENTOR.
ROGER M. CHRISTENSON
KARL R. GOSSELINK and
SAMUEL PORTER JR.
Chisholm and Spencer
ATTORNEYS United States Patent Office 3,362,844
Patented Jan. 9, 1968

3,362,844
METHYL METHACRYLATE COATING
SYSTEM FOR METAL
Roger M. Christenson, Gibsonia, Pa., Karl R. Gosselink, Rocky River, Ohio, and Samuel Porter, Jr., Tarentum, Pa., assignors to Pittsburgh Plate Glass Company, Pittsburgh, Pa., a corporation of Pennsylvania
Filed Apr. 8, 1964, Ser. No. 358,316
12 Claims. (Cl. 117—75)

ABSTRACT OF THE DISCLOSURE

Metal articles coated with thermoplastic methyl methacrylate lacquer are provided with greatly improved properties by utilizing as a primer on the metal and beneath the lacquer a coating composition having as the major resinous component an aldehyde-modified interpolymer containing 2 to 7 percent of unsaturated carboxylic acid amide, 2 to 10 percent of unsaturated acid, and one or more other ethylenically unsaturated monomers. Best results are attained if the interpolymer contains a combination of monomers which tend to give hard polymers, such as styrene and methyl methacrylate, with monomers which tend to give soft polymers, such as ethyl acrylate. Articles coated with coating systems including a methyl methacrylate lacquer over such a primer have outstanding adhesion, corrosion resistance and appearance, as compared to those made with conventional primers, such as alkyd-based primers.

---

This application is a continuation-in part of application Ser. No. 109,333, filed May 11, 1961, now abandoned.

This invention relates to a multiple layer coating system for metals. More particularly, it relates to compositions comprising certain unsaturated carboxylic acid amide interpolymers for use as primers or primer-surfacers in coating systems wherein a topcoat of a methyl methacrylate lacquer is superimposed upon said primer or primer-surfacer.

Because methyl methacrylate lacquers composed of homopolymers and copolymers of methyl methacrylate form films having excellent gloss retention over long periods of exposure both outdoors and indoors, their use has become widespread. The term "methyl methacrylate lacquer" encompasses such methyl methacrylate homopolymers and copolymers and refers to those polymers containing predominantly methyl methacrylate. One class of polymers within the scope of this term contains 0 percent to 50 percent of an alkyl ester of an ethylenically unsaturated carboxylic acid having 1 to 2 carboxyl groups and 2 to 18 carbon atoms in the alkyl group.

These methyl methacrylate lacquers have been utilized by the automotive industry as top finish coats for automobiles and other vehicles. With the expanding use of these methyl methacrylate lacquers, however, comes many problems which have to be overcome to employ them successfully as automotive finishes or finishes for other metallic articles which are to be used outdoors. The biggest problem which is encountered is the poor adhesion of these methyl methacrylate lacquers to metal surfaces, which in turn results in a low level of metal protection and low level of rust inhibition of the painted metal surface. In order to overcome this shortcoming of methyl methacrylate lacquers, various primers have been developed which act as a bond between the lacquers and the metal surface. In other words, the chief requirement for the primer composition is that it have very good adhesion both to the metal substrate and to the topcoat lacquer.

In choosing a suitable composition to be used as a primer, it is usually no problem to find one which will have extremely good adhesion to a metal surface; however, it is quite the exception to find one which will form a good, strong, adhesive bond between the primer and the topcoat of methyl methacrylate lacquer composition. By their very nature, methyl methacrylate polymers have poor adhesion because they have no reactive polar groups such as are known to promote adhesion and must rely primarily on mechanical adhesion. Attempts have been made in the past to improve adhesion of the methacrylate lacquers (United States Patent No. 2,940,872) by copolymerizing minor amounts of monomers therewith; however, the primers of the instant invention provide extremely good adhesion for any methacrylate lacquer regardless of composition and therefore no modifications need be made with the topcoat lacquers.

In many instances, especially in the automotive industry, another composition is used as a surfacer on top of the primer, both of which are covered by a finished topcoat or lacquer. This surfacer composition is usually produced with a high pigment to binder ratio on the order of about 50 percent to 45 percent by volume of the binder or vehicle, and is used to fill any discontinuities in the surface of the substrate and also provides a surface which may be sanded to a smooth and level base for the topcoat. It has been found that the sanded or unsanded surfaces of the primer-surfacer composition are far from satisfactory even though the adhesion between the primer-surfacer coating and the topcoat is improved because these high pigment to binder ratios produce a surface which results in poor "hold-out" of the methyl methacrylate lacquer topcoat, that is, that the gloss of the topcoat is decreased by the minute roughness of the surfacer. It is also well known that high pigment to binder ratio primer-surfacers lack the required protection against salt water corrosion and also lack flexibility and resistance to chipping when abraded.

It has been discovered that the above-mentioned problems, which are encountered in the use of numerous primer compositions, are overcome through the use of a primer in which the major resinous component is an unsaturated carboxylic acid amide interpolymer which has been modified by reaction with an aldehyde, preferably in the presence of an alkanol. These resinous compositions have excellent adhesion to both the metal substrate and the topcoats of methyl methacrylate lacquer, and therefore make it possible to take full advantage of the outstanding gloss retention of these lacquers when used as a coating for metals. Since the methyl methacrylate lacquer composition has extremely good adhesion to these compositions without the presence of any pigment, these aldehyde-modified carboxylic acid amide interpolymers eliminate the need for a high pigment to binder ratio, and therefore eliminate the need for a separate composition to be used as a surfacer. Because of the lower pigment to binder ratio, there is no problem with the poor "hold-out" which is present when acrylic topcoats are applied over such surfacers.

In addition to being primarily useful as automotive finishes, the coating systems of the instant invention find utility as surface finishes for any one of a widevariety of objects, such as appliances, decorative structures which are to be used both indoors and outdoors, and various containers, which include both glass and metal types.

Multi-layer coating systems of the instant invention also find considerable utility in other areas. For example, many times it is desirable to have a rough surface smooth, in order to have the resulting methyl methacrylate lacquer for surface coatings resulting in a pleasing appearance. The aldehyde-modified carboxylic acid amide interpolymers are very useful as a covering for many rough surfaces because of their good adhesion thereto and because they readily bake to a hard, thermoset state which forms an integral, tough, chemical and solvent resistant surface with the said object.

The coating system of the instant invention is depicted structurally in the accompanying drawing.

The amide interpolymer resins employed in the instant invention contain from about 2 percent to about 7 percent by weight of an unsaturated carboxylic acid amide, from about 2 percent to about 10 percent by weight of an alpha, beta-ethylenically unsaturated carboxylic acid and at least one other copolymerizable ethylenically unsaturated monomer.

In the preparation of the aldehyde-modified amide interpolymer resins, the unsaturated carboxylic acid amide is polymerized with the other ethylenically unsaturated monomers, and the resulting interpolymer reacted with an aldehyde, preferably in the presence of an alcohol. The exact mechanism whereby the amide interpolymers are obtained is not definitely known, but is believed to begin by the formation initially of a relative short chain soluble interpolymer. The short chain interpolymer then reacts with an aldehyde, such as formaldehyde, to replace a hydrogen atom of the amide group with a methylol or other alkylol group.

In the event the eldhyde is utilized in the form of a solution in butanol or other alkanol, etherification will take place so that at least some of the alkylol groups in the structure will be converted to groups of the structure:

where R and $R_1$ are each selected from the class consisting of hydrogen and alkyl radicals; R being derived from the aldehyde and $R_1$ being the radical derived by removing the hydroxyl group from the alkanol.

It is desirable that at least about 50 percent of the alkylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms, may also be employed, as may aromatic alcohols, such as benzyl alcohol, or cyclic alcohols.

While an acrylamide is preferred for use in forming the interpolymer component, using this term to mean acrylamide, methacrylamide and similar alpha-alkyl acrylamides, any unsaturated carboxylic acid amide can be employed. Such other amides include itaconic acid diamide, crotonamide, fumaric acid diamide, maleic acid diamide, and other amides of alpha, beta-ethylenically unsaturated carboxylic acids containing up to about 10 carbon atoms. Maleuric acid and esters thereof, and imide derivatives such as N-carbamyl maleimide may also be utilized.

The alpha, beta-ethylenically unsaturated carboxylic acid component of the interpolymer is preferably an acrylic acid, such as acrylic acid, methacrylic acid, ethacrylic acid, or a similar substituted acrylic acid. However, other acids can also be employed, for example, those having up to about 6 carbon atoms and including maleic acid and similar acids.

The remainder of the interpolymer may be made up of any polymerizable monomeric compound containing at least one $CH_2=C<$ group. Examples of such monomers include monoolefinic and diolefinic hydrocarbons, halogenated monoolefinic and diolefinic hydrocarbons, esters of organic and inorganic acids, organic nitriles, and acid monomers. Some specific monomers which can be used include styrene, alpha-methylstyrene, isobutylene, butadiene-1,3, alpha-chlorostyrene, alpha-bromostyrene, vinyl chloride, vinylidene chloride, vinyl acetate, vinyl butyrate, methyl methacrylate, ethyl methacrylate, ethyl acrylate, allyl chloride, dimethyl maleate, diethyl fumarate, acrylonitrile, methacrylonitrile, and the like.

A number of amide interpolymers and their blends with various other resinous materials are disclosed in United States Patents Nos. 2,870,116, 2,870,117, 2,940,943, 2,940,945 and 3,037,963. These can be employed in the instant invention provided they contain the amount of amide and acid set forth above. The large number of comonomers described in these patents illustrate the variety of monomers which can be utilized in addition to the amide and acid.

The preferred interpolymers for use herein contain, along with the amide and acid, from about 10 percent to about 80 percent by weight of a monomer or monomers which tend to increase the hardness of the polymer, and from about 10 percent to about 86 percent by weight of one or more monomers which tend to produce soft films. The "hard monomers" include vinyl aromatic monomers, such as styrene, alpha-methylstyrene and vinyl toluene; alkyl methacrylates having up to about 4 carbon atoms in the alkyl group, such as methyl methacrylate and ethyl methacrylate; and acrylonitrile. The "soft monomers" include alkyl acrylates having up to about 10 carbon atoms in the alkyl group, such as methyl acrylate, ethyl acrylate, butyl acrylate and 2-ethylhexyl acrylate; alkyl methacrylates having from about 8 to about 12 carbon atoms in the alkyl group, such as decyl methacrylate and lauryl methacrylate; and dialkyl esters of aplha, beta-ethylenically unsaturated acids having up to about 8 carbon atoms in the alkyl groups, such as dimethyl maleate, dibutyl maleate, dibutyl itaconate, di-2-ethylhexyl fumarate, and the like. The proportions of the various monomers can be varied, within the specified ranges, to produce interpolymers of the desired properties, all of which are advantageously utilized in the herein-described primers.

In carrying out the interpolymerization reaction a catalyst is utilized, such as cumene hydroperoxide, benzoyl peroxide or a similar peroxide, or an azo compound, such as p-methoxyphenyl diazothio(2-naphthyl)ether or azobis(isobutyronitrile). The quantity of catalyst employed can be varied considerably; however, in most instances it is desirable to utilize from about 0.1 percent to 3.0 percent.

Since it is desirable that the interpolymers of an unsaturated carboxylic acid amide with other ethylenically unsaturated monomers be relatively low in molecular weight so that they can be dissolved at high solids and low viscosities, a chain modifying agent or chain transfer agent is ordinarily added to the polymerization mixture. The mercaptans, such as dodecyl mercaptan, tertiary dodecyl mercaptan, octyl mercaptan, hexyl mercaptan, and the like, are conventionally used for this purpose, as can other chain transfer agents or "short-stopping" agents, such as cyclopentadiene, allyl acetate, allyl carbamate, alpha-methylstyrene, alpha-methylstyrene dimers, and the like.

The polymerization is best carried out by admixing the acrylamide, or other polymerizable amide, and the other monomer or monomers, the catalyst and chain transfer agent, if any, in the solvent, and refluxing the resulting solution for a time sufficient to obtain the desired conversion. Ordinarily, the polymerization will be complete in about 1 to 16 hours. It may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of the reaction is obtained by adding the acrylamide to the polymerization mixture incrementally. Good agitation is also desirable.

The amide interpolymer is then further reacted with an aldehyde, preferably in the presence of an alcohol. Formaldehyde, in solution in water (Formalin) or in an alkanol, such as butanol, or a formaldehyde-yielding substance, such as paraformaldehyde, trioxymethylene or hexamethylenetetramine, is greatly preferred. However, other aldehydes, including acetaldehyde, butyraldehyde, furfural and the like, preferably containing only atoms of carbon, hydrogen and oxygen, can be used.

It is ordinarily preferred to utilize two equivalents of formaldehyde for each amide group present in the interpolymer, although there can be used, for example, as high as 3.0 equivalents of aldehyde and as low as 0.2 equivalent for each amide group in the interpolymer. The reaction is preferably carried out in the presence of a mild acid catalyst, such as maleic anhydride.

Similar polymeric materiels may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method does not require reaction of the polymer with an aldehyde since the N-alkoxyalkyl amide monomers already contain a

group, wherein R and $R_1$ have the meanings set forth above.

Regardless of the method by which the resinous material is obtained, it will contain in the polymer chain recurrent groups of the structure:

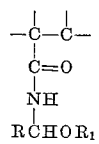

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent, of the radicals represented by $R_1$ are derived from the alcohol. When the aldehyde is utilized alone, that is, not in the alcohol solution, the radical $R_1$, of course, will represents hydrogen. The free valences in the above structure may be satisfied with either hydrogen or hydrocarbon, depending upon the amide which is utilized in the interpolymerization reaction.

Further details as to the preparation of the amide interpolymers can be found in the patents mentioned above.

Where the aforementioned aldehyde-modified carboxylic acid amide interpolymers are to be employed as primers for automotive finishes, it is preferable that low tempearture curing compositions be employed because much of the existing equipment which is used by the automotive industry to cure the coatings of the present invention cannot produce temperatures much above 250° F. It has been found that when the aldehyde-modified unsaturated carboxylic acid amide interpolymers are blended with an adduct of a hydroxyl-containing polymer and a carboxylic acid anhydride, the curing temperatures are lowered to below 300° F. and even as low as about 250° F. Such adducts and their preparation are described in United States Patent No. 3,118,853.

Any dicarboxylic acid anhydride may be reacted with the hydroxyl-containing polymer to form the adducts utilized in combination with the aldehyde-modified amide intepolymer resin. Maleic anhydride is particularly preferred because of its low cost and ready availability; however, other anhydrides such as itaconic anhydride, succinic anhydride, adipic anhydride, and other saturated and unsaturated dicarboxylic acid anhydrides, containing up to about 12 carbon atoms, may be used with good results. In preparing adducts of the free hydroxyl-containing polymers with the dicarboxylic acid anhydrides, care should be taken so as to prevent substantial esterification beyond the opening of the anhydride ring.

One preferred method of carrying out the adduct formation involves admixing the hydroxyl-containing polymer and the dicarboxylic acid anhydride in a solvent and refluxing the resulting solution for a period sufficient to form the desired adduct, ordinarily 5 to 10 hours. While useful products can be obtained when all of the free hydroxyls of the polymer are reacted with the dicarboxylic acid anhydrides, the reaction is preferably carried to a stage where about 20 percent to 80 percent of such hydroxyls are reacted, and it is particularly preferred that the adduct contain about 40 percent to 60 percent of the hydroxyls in unreacted form. The acid number of the adduct solids should ordinarily be in the range of about 20 to 200 and the hydroxyl value in a range of about 40 to 200.

It is preferred that the adduct of a hydroxyl-containing polymer of carboxylic acid anhydride be employed in amounts ranging from about 10 percent to about 20 percent by weight of the primer composition; but, however, they may be employed in amounts of as little as 5 percent by weight to about 35 percent by weight. Amounts higher than 35 percent by weight tend to lessen the thermosetting properties of the interpolymer.

In addition to the above-mentioned adducts, melamine-formaldehyde or urea-formaldehyde also may be used to lower the curing temperature. Amounts within the range of about 5 percent to about 25 percent may be advantageously employed to reduce the curing temperature to about 250° F.

The following examples illustrate in detail the preparation and use of the resinous compositions which may be employed in the resinous primer compositions of the instant invention. These examples are given by way of illustration and not by way of limitation. All parts and percentages are by weight unless otherwise specified.

AMIDE INTERPOLYMER A

An interpolymer was produced from the following:

| | Parts by weight |
|---|---|
| Acrylamide | 5.0 |
| Styrene | 52.5 |
| Ethyl acrylate | 40.0 |
| Methacrylic acid | 2.5 |
| Butanol | 50.0 |
| Xylene | 50.0 |

The above ingredients were admixed in the presence of 1 part of cumene hydroperoxide and 0.5 part of tertiary-dodecyl mercaptan, and refluxed for 2 hours. Cumene hydroperoxide (0.5 part) was then added and the mixture was refluxed for three successive 2-hour intervals, after each of which additions of 0.5 part cumene hydroperoxide were made. After the fourth 2-hour reflux period, 10.5 parts of butyl Formcel and 0.13 part of maleic anhydride were added to the mixture which was azeotropically distilled for 3 hours to remove water of reaction. The final product had the following properties:

| | |
|---|---|
| Solids (percent) | 49.7 |
| Viscosity (Gardner-Holdt) | V+ |
| Acid value | 7.05 |

AMIDE INTERPOLYMER B

The following were charged into a reaction vessel:

| | Parts by weight |
|---|---|
| Styrene | 3302.8 |
| Methacrylic acid | 170.3 |
| Acrylamide | 340.5 |
| 2-ethylhexyl acrylate | 2996.4 |
| Butanol | 3405.0 |
| Xylene | 3405.0 |

The above mixture was refluxed for 2 hours in the presence of 68.0 parts of cumene hydroperoxide. The mass was refluxed for four more successive 2-hour reflux periods, before each of which additions of 34.0 parts of cumene hydroperoxide were made. After the fifth reflux period, 34.0 parts of cumene hydroperoxide and a solution containing 717.3 parts of butyl Formcel and 10.1 parts of maleic anhydride were added. This mixture was then refluxed for another hour and cooled. The resulting resin had the following properties:

| | |
|---|---|
| Solids (percent) | 48 |
| Viscosity (Gardner-Holdt) | V− |
| Acid value | 7.61 |

AMIDE INTERPOLYMER C

An interpolymer was prepared from the following:

| | Parts by weight |
|---|---|
| Styrene | 375 |
| Ethyl acrylate | 400 |
| Acrylamide | 50 |
| Acrylonitrile | 150 |
| Methacrylic acid | 25 |
| Xylene | 500 |
| Butanol | 500 |

The above ingredients were admixed with 10 parts of cumene hydroperoxide and 10 parts of tertiary-dodecyl mercaptan, and refluxed for 2 hours. The reaction mixture was then refluxed for three 2-hour intervals with additions of 5 parts of cumene hydroperoxide being made before each interval. After the last 2-hour interval, 105 parts of butyl Formcel, 5 parts of cumene hydroperoxide and 1.3 parts of maleic anhydride were added to the reaction mixture. The reaction was then continued for three more hours, during which 25 parts of water were azeotropically removed. The resinous composition had the following properties:

| | |
|---|---|
| Total solids (percent) | 4.85 |
| Viscosity (Gardner-Holdt) | Y |

AMIDE INTERPOLYMER D

An interpolymer was prepared from the following mixture:

| | Parts by weight |
|---|---|
| Acrylamide | 10 |
| Styrene | 97 |
| Ethyl acrylate | 88 |
| Methacrylic acid | 5 |
| Butanol | 100 |
| Xylene | 100 |

The above solution was refluxed for 2 hours in the presence of 2 parts of cumene hydroperoxide and 1 part of tertiary-dodecyl mercaptan. One (1) part of cumene hydroperoxide was then added and the mixture was refluxed for three successive 2-hour intervals, after each of which additions of 1 part of cumene hydroperoxide were made. After the fourth 2-hour reflux interval, 21 parts of butyl Formcel and 0.25 part of maleic anhydride were added to the mixture, which was azeotropically distilled for 3 hours to remove water. Some of the solvent mixture (100 parts) was then removed and replaced by a high boiling aromatic naphtha solvent (Solvesso 100). The final product had the following properties:

| | |
|---|---|
| Solids (percent) | 49.7 |
| Viscosity (Gardner-Holdt) | U+ |
| Acid value | 7.79 |

AMIDE INTERPOLYMER E

An interpolymer was prepared from the following:

| | Parts by weight |
|---|---|
| Acrylamide | 5 |
| Methyl methacrylate | 40 |
| Ethyl acrylate | 35 |
| Acrylonitrile | 10 |
| Methacrylic acid | 10 |
| Xylene | 50 |
| Butanol | 50 |

The above mixture was refluxed in the presence of 2.0 parts of tertiary-dodecyl mercaptan and 1.0 part of cumene hydroperoxide for 2 hours, after which 0.5 part of cumene hydroperoxide was added. The reaction mass was refluxed for another 2-hour period, after which 0.5 part of cumene hydroperoxide, 10.5 parts of butyl Formcel and 0.13 part of maleic anhydride were added. The mass was refluxed for 3 hours azeotropically to remove the formed water. The resulting resinous composition had the following properties:

| | |
|---|---|
| Solids (percent) | 40.95 |
| Viscosity (Gardner-Holdt) | S |
| Acid value | 28.3 |

The primer coat compositions of the instant invention may be employed with any methyl methacrylate lacquer, including homopolymers and copolymers in which a major proportion of methyl methacrylate is present. Representative of the wide variety of such lacquers which may be used in the coating system of the instant invention is the particularly useful and preferred group of polymethyl methacrylate copolymers in which methyl methacrylate is copolymerized with at least 10 percent by weight of an alkyl ester of an unsaturated carboxylic acid having 1 to 2 carboxyl groups, such as acrylic acid, methacrylic acid, itaconic acid, and the like. A number of these resinous compositions are described in copending application Ser. No. 108,292, filed May 8, 1961. The modifying monomer, that is, the alkyl ester of an unsaturated carboxylic acid, is preferably utilized in an amount of about 10 percent to about 30 percent by weight, and the methyl methacrylate, 70 percent to 90 percent by weight. However, amounts as high as 50 percent by weight of the alkyl ester also may be utilized to give copolymers which impart the desired characteristics to coating compositions. The exact quantity of the alkyl ester of an unsaturated carboxylic acid employed will depend, of course, on the particular ester utilized; for example, those monomers with the most plasticizing ability, such as ethyl acrylate, butyl acrylate, octyl acrylate, lauryl methacrylate and decyl-octyl methacrylate, should be used in smaller amounts. Broadly, the alkyl groups may contain from 2 to 18 carbon atoms; preferably, however, they should contain at least 8 carbon atoms.

The copolymers of methyl methacrylate and alkyl methacrylates should preferably possess a relative viscosity ($N_r$) in the range of about 1.15 to 1.35 to function satisfactorily in coating compositions. Relative viscosity is defined as follows:

$$N_r = \frac{\text{efflux time of polymer solution in seconds}}{\text{efflux time of solvent to be used in polymer solution in seconds}}$$

The efflux times are measured in accordance with the procedure of ASTM D–445–46T (Method B) using as the oil of said procedure (1) a solution of 0.25 gram of the methyl methacrylate copolymer in 50 milliliters of ethylene dichloride, and (2) a sample of the ethylene dichloride utilized in making the solution. The determinations are run at 25° C. in an Ostwald Viscometer, Series 50.

The above viscosity range corresponds to a molecular weight in the range of about 87,000 to 137,000 as measured by ASTM D-445-46T utilizing the constants for methyl methacrylate.

Copolymers having the desirable viscosity characteristics described hereinabove can be obtained by either emulsion polymerization, solution polymerization, or suspension (bead or pearl) polymerization. Preferably, a suspension polymerization process is utilized.

The following are examples of the preparation of various methyl methacrylate copolymers which are particularly useful as topcoats in the multiple layer coating systems of the instant invention.

COPOLYMER F

A copolymer of 80 percent methyl methacrylate and 20 percent ethyl acrylate was prepared by suspension polymerization as follows:

Two separate solutions were prepared: Solution (1) contained 300 parts by weight of a 1.0 percent aqueous solution of a completely hydrolyzed, high viscosity polyvinyl alcohol (Elvanol 72-60) and 10 parts of an aqueous buffer solution made up from 1.7 parts of sodium monohydrogen phosphate and 0.1 part of sodium dihydrogen phosphate; solution (2) contained 80 parts of methyl methacrylate, 20 parts of ethyl acrylate, 1 part of benzoyl peroxide and 0.5 part of tertiary-dodecyl mercaptan. The two solutions were charged into a glass reactor fitted with thermometer, condenser and stirrer. Rapid agitation was initiated to form beads of about 1 millimeter in diameter. The reactor was purged with inert gas and the agitator slowed to about 200 revolutions per minute, this speed being just enough to keep the beads in suspension. Heat was then applied by water and steam to give a reaction temperature of 75° C. to 78° C. These conditions were maintained for 1½ to 2 hours, good conversion being obtained. The reactor was then cooled to room temperature and the beads removed by filtration through a glass cloth. The yield obtained was about 95 percent. The polymer had a Gardner viscosity of H-I at 25 percent solids content in toluene, and could be sprayed from a solution composed of 85 percent toluene and 15 percent Cellosolve acetate at about 12 percent to 15 percent solids.

COPOLYMER G

A copolymer of 90 parts of methyl methacrylate and 10 parts of lauryl methacrylate was prepared by suspension polymerization utilizing 280 parts of water and 10 parts of a buffer solution prepared with a ratio of 1.7 parts by weight of sodium hydrogen phosphate and 0.1 part of sodium dihydrogen phosphate, and employing 0.5 part of tertiary-dodecyl mercaptan and 1 part of benzoyl peroxide as a catalyst. The suspension agent was 20 parts of a 15 percent aqueous solution of sodium polyacrylate. The product when dissolved in toluene (25 percent solution) had a Gardner-Holdt viscosity of H.

Other copolymers are prepared similarly from monomers as set forth in Table I.

TABLE I

| Copolymer | Comonomer | Parts of Comonomer | Parts of Methacrylate |
|---|---|---|---|
| H | Ethyl acrylate | 10 | 90 |
| I | do | 15 | 85 |
| J | Butyl methacrylate | 40 | 60 |
| K | Dimethyl itaconate | 40 | 60 |
| L | Dibutyl itaconate | 20 | 80 |
| M | Octyl methacrylate | 10 | 90 |
| N | do | 20 | 80 |
| O | Decyl-octyl methacrylate * | 10 | 90 |
| P | Hexyl methacrylate | 20 | 80 |

* Mixture of decyl methacrylate and octyl methacrylate.

Methyl methacrylate copolymers can also be prepared by emulsion polymerization, for example, utilizing the following typical procedure:

Solution I: Parts
   Water _____ 300
   Ammonium persulfate _____ 1
Solution II:
   Monomers _____ 100
   Tertiary-dodecyl mercaptan _____ 0.5

The two solutions were added to a glass reactor fitted with a thermometer, condenser and agitator.

The reactor was purged with an inert gas and the mixture agitated vigorously. Heat was then applied with water and steam, and the polymerization mixture was held at about 80° C. for about ½ hour, at which time the exothermic reaction occurred and the reaction temperature rose to 90° C. to 94° C. The polymerization mixture was then cooled to 80° C. and held for an additional ½ hour and then cooled to room temperature and precipitated by the addition of 2 parts of isopropanol to 3 parts of latex. The polymeric product was removed by filtration, washed and dried in an oven.

The composition of several copolymers prepared in this manner is indicated in Table II.

TABLE II

| Copolymer | Comonomer | Parts of Comonomer | Parts of Methyl Methacrylate |
|---|---|---|---|
| Q | Butyl methacrylate | 25 | 75 |
| R | Ethyl methacrylate | 20 | 80 |
| S | do | 40 | 60 |

The copolymers described above can be formulated into highly desirable lacquers and formed solutions in organic solvents to give easily sprayable compositions having a polymer solids content in the range of about 12 percent to 16 percent. No webbing was noted and films prepared from the solutions had excellent gloss and durability.

An example of the preparation of a topcoat acrylic lacquer copolymer as described above is as follows:

LACQUER T

A pigment paste was made from the following materials:

Parts by weight
Titanium dioxide pigment (Tipure R-610) _____ 405
Suspending agent, alkyl ammonium montmorillonite (Bentone 34)[1] _____ 56.7
A 35 percent solution of Copolymer G in methyl ethyl ketone _____ 163.2

[1] Any one of the well-known suspending agents, such as other members of the Bentone series, MPA (Baker Castor Oil Company), and aluminum stearate may be used.

The above ingredients were charged into a Baker-Perkins mill and ground for 20 minutes, and then charged into a pebble mill with 275 additional parts of the same solution of Copolymer G, 96.7 parts of Cellosolve acetate and 99.8 parts of methyl ethyl ketone, and ground for 16 hours.

A white lacquer was prepared according to the following formulation:

Parts by weight
Pigment paste above _____ 300
A 36.5 percent solution of Copolymer G in toluene _ 395
Dicyclohexyl phthalate _____ 39
Butylbenzyl phthalate _____ 19.8
A 12 percent 5-6 second solution containing 5 percent ethyl alcohol, 40 percent toluene and 43 percent butyl acetate _____ 41.5
Butyl acetate _____ 26.0
Toluene _____ 28.8
Xylene _____ 21.6
Cellosolve acetate _____ 8.0
1 percent DC-200 silicone solution in toluene ____ 0.25

The above ingredients were homogeneously admixed until a lacquer consistency was obtained.

As indicated above, it is desirable, although not essential, to include in the primer composition a small proportion of an adduct of a dicarboxylic acid anhydride and a hydroxyl-containing polymer. Representative examples of such adducts are as follows:

ANHYDRIDE ADDUCT U

The following materials were charged into a glass reactor equipped with stirrer, condenser and temperature measuring means:

| | Parts by weight |
|---|---|
| Allyl alcohol-styrene copolymer (Shell X-450)—OH equivalent per 100 grams—0.45; hydroxyl groups per mole—5.2 | 85.3 |
| Maleic anhydride | 14.7 |
| Methyl ethyl ketone | 33.3 |

The above components were refluxed until the product had an acid value of 60–64 (about 4 to 8 hours). The product was then diluted to 50 percent solids with toluene, the resulting resinous product having the following analysis:

| | |
|---|---|
| Solids (percent) | 50 |
| Hydroxyl value | 65.0 |
| Acid value | 42.0 |
| Viscosity (Gardner-Holdt) | E–F |

ANHYDRIDE ADDUCT V

The above was repeated substituting succinic anhydride for the maleic anhydride. The reaction was carried out in such a way as to react the succinic anhydride with about 40 percent of the available hydroxyl groups of the allyl alcohol-styrene copolymer. The resulting product had a Gardner-Holdt viscosity of W and an acid value of 41.0.

The preparation and use of the primers and coating systems herein are illustrated by the following examples:

*Example 1*

A pigment paste was made up as follows:

| | Parts by weight |
|---|---|
| Iron oxide pigment (Fe$_2$O$_3$) | 88 |
| Barium sulfate (Barytes) | 500 |
| Aluminum silicate (Al$_2$SiO$_3$ hydrate) | 60 |
| Talc | 44 |
| Suspending agent, alkyl ammonium montmorillonite (Bentone 34) | 8 |
| Amide interpolymer A | 243 |
| Xylene | 237 |

The above ingredients were mixed in a pebble mill, and ground, using steel balls, for 18 hours to a 6+ Hegman reading.

This pigment paste was utilized in a primer composition as follows:

| | Parts by weight |
|---|---|
| Pigment paste above | 416 |
| Amide interpolymer A | 90 |
| Anhydride adduct U | 30 |
| Toluene | 94 |
| Cellosolve acetate | 70 |

The primer was then thinned to a suitable spraying viscosity and applied to a phosphatized steel panel (Bonderite 100) in sufficient amounts to produce a smooth, uniform, dry coating about 1.2 mils thick after baking for 45 minutes at 275° F. Two other panels were sprayed with the same primer, one of which was baked for 30 minutes at 250° F. and another for 60 minutes at 290° F. The cooled primer panels were then sprayed with a poly(methyl methacrylate) lacquer (Lucite) to a film thickness of about 2.0 mils, and baked for 30 minutes at 225° F. The panels were then subjected to several tests, including tests for acrylic adhesion, a mandrel bend test, and a cold bend test.

The acrylic adhesion was tested in three different ways: (1) by the "cross-hatch" method; (2) the "knife" method; and (3) the "tape" method.

The cross-hatch method comprises cutting a series of parallel lines about 1/16 inch apart in the coating surface and another series of parallel lines over the same area, but perpendicular to the first set of parallel lines. The amount of chipping observed is a measure of the adhesion.

The knife method comprises gouging a groove into the surface of the coating with the flat tip of the knife and observing the manner in which the coating is removed. If the adhesion is poor, the coating will break freely away from the substrate.

The tape method comprises cutting an X in the surface of the coating with a knife, adhering a pressure sensitive tape against the X surface and removing the said tape in a rapid motion almost parallel to the plane of the surface. The amount of coating which comes off with the tape is also a measure of the adhesion of the coating.

The mandrel bend test comprises placing the coated panel on a standard conical mandrel and rolling and bending the said panel intimately around the cone. If the adhesion is poor, the coating will peel from the tapered end of the cone.

The cold bend test comprises bending the coated panel around a cylindrical mandrel at temperatures below freezing (0° F.) wherein both the mandrel and the panel have been maintained below freezing for at least an hour.

The panels above each exhibited excellent properties when tested in this manner.

*Example 2*

A pigment paste was made up as follows:

| | Parts by weight |
|---|---|
| Lithopone (70 percent barium sulfate and 30 percent zinc sulfide) | 267 |
| Suspending agent (MPA, multipurpose additive from Baker Castor Oil Company) | 3 |
| Amide interpolymer A | 32 |
| Lamp black pigment (Mollaco black) | 30 |
| High boiling aromatic solvent (Solvesso 100) | 68 |

The above ingredients were mixed in a jiffy mill for 30 minutes, after which 50 parts more of the resinous product of Amide Interpolymer A was added as holdout to the said mixture. The mixture was then further ground for ½ hour to effect homogeneity of the mixture.

A primer was then formulated as follows:

| | Parts by weight |
|---|---|
| Pigment paste above | 374 |
| Amide interpolymer A | 102 |
| Anhydride adduct U | 30 |
| Butanol | 28 |
| High boiling aromatic solvent (Solvesso 100) | 100 |

*Example 3*

A pigment paste was prepared as follows:

| | Parts by weight |
|---|---|
| Iron oxide pigment | 44 |
| Barium sulfate | 250 |
| Suspending agent, alkyl ammonium montmorillonite (Bentone 34) | 4 |
| Amide interpolymer C | 121 |
| Xylene | 119 |
| Mica | 52 |

The above ingredients were charged into a pebble mill and ground for 16 hours until a homogeneous product was obtained.

A typical primer which is to be used in accordance with the instant invention was prepared using the following formulation:

| | Parts by weight |
|---|---|
| Pigment paste above | 416 |
| Amide interpolymer C | 89 |
| Anhydride adduct U | 30 |
| Butanol | 39 |
| High boiling aromatic solvent (Solvesso 100) | 206 |

The primer was thinned to a suitable spraying viscosity and the composition was applied to phosphatized steel panels (Bonderite 100) in sufficient amount to produce a smooth, uniform, dry coating of about 1 mil thickness. The coated panels were baked for 45 minutes at 275° F. The primed panels were cooled to room temperature and subsequently sprayed with a topcoat of the lacquer set forth as Lacquer T to produce a film of about 2 mils thickness and baked for 30 minutes at 225° F. The panels were then tested for adhesion as before. The topcoat manifested good adhesion when tested by the cross-hatch, knife and tape tests.

To compare the primers of this invention with prior art primers, an alkyd primer of the type commercially available and commonly used as a primer for steel products, such as automobile bodies, fenders and hoods, was prepared by pigmenting an organic film-forming material with conventional primer pigment. The pigment paste was prepared as follows:

| | Parts by weight |
|---|---|
| Lamp black pigment (Mollaco black) | 30 |
| Lithopone (70 percent barium sulfate and 30 percent zinc sulfide) | 267 |
| Suspending agent (MPA, multipurpose additive from Baker Castor Oil Company) | 3 |
| Alkyd resin, 50 percent solids (55 percent glycerol phthalate, 39.1 percent dehydrated castor oil, 2.4 percent para-tertiary butyl benzoic acid and 3.5 percent glyceryl) | 90 |
| High boiling aromatic solvent (boiling point 150° C.–170° C.) (Solvesso 100) | 60 |

The above ingredients were mixed in a pebble mill for 16 hours. The resulting pigment paste contained 67 percent pigment and 10 percent of the alkyd resin.

The alkyd primer was formulated as follows:

| | Parts by weight |
|---|---|
| Pigment paste above | 374 |
| Alkyd resin, 50 percent solids (55 percent glycerol phthalate, 39.1 percent dehydrated castor oil, 2.4 percent para-tertiary butyl benzoic acid) | 125 |
| Iron naphthenate (6 percent iron solution in mineral spirits) | 2.2 |
| High boiling aromatic solvent (Solvesso 100) | 131 |

The above alkyd primer and the primers described in Examples 1 and 2, thinned to a suitable spraying viscosity, were each applied to a phosphatized steel panel (Bonderite 100) in sufficient amount to produce a smooth, uniform, dry coating about 1.3 mils thick. The panels coated with the primers were baked for 45 minutes at 275° F. The primed panels were cooled to room temperature and subsequently sprayed with the topcoat of Lacquer T described above to produce a film of 2.0 mils thickness and baked for 30 minutes at 225° F. The panels were then tested for adhesion using the "cross-hatch," "knife" and "tape" tests. The results are indicated in Table III.

TABLE III

| Panel | Cross-hatch | Knife | Tape |
|---|---|---|---|
| Panel coated with primer of Example 1. | Excellent | Excellent | No loss of adhesion. |
| Panel coated with primer of Example 2. | do | do | Do. |
| Panel coated with alkyd primer above. | Complete failure. | Poor | Complete loss of adhesion. |

Comparable results to those described above are obtained using other primers and lacquers made with the various polymers disclosed and exemplified above, on substrates of metals such as steel, treated steels, aluminum and the like.

According to the provisions of the patent statutes, there are described above the invention and what are now considered to be its best embodiments. However, within the scope of the appended claims, it is to be understood that the invention can be practiced otherwise than as specifically described.

We claim:

1. A metal article having a hard, adherent, crack-resistant, multiple-layer coating comprising a layer of primer and a superimposed layer of a thermoplastic methyl methacrylate lacquer in adherent contact therewith, said primer having as its major resinous component an interpolymer of (a) from about 2 percent to about 7 percent by weight of an unsaturated carboxylic acid amide, (b) from about 2 percent to about 10 percent by weight of an alpha, beta-ethylenically unsaturated carboxylic acid, and (c) at least one other monomer having a $CH_2=C<$ group, said interpolymer being characterized by having amido hydrogen atoms replaced by the structure:

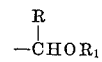

where R is selected from the group consisting of hydrogen and lower alkyl radicals, and $R_1$ is selected from the group consisting of hydrogen and radicals derived by removing the hydroxyl group from a monohydric alcohol.

2. A metal article having a hard, adherent, crack-resistant, multiple-layer coating comprising a layer of primer and a superimposed layer of a thermoplastic methyl methacrylate lacquer in adherent contact therewith, said primer having as its major resinous component an interpolymer of (a) from about 2 percent to about 7 percent by weight of an unsaturated carboxylic acid amide, (b) from about 2 percent to about 10 percent by weight of an alpha, beta-ethylenically unsaturated carboxylic acid, (c) from about 10 percent to about 80 percent by weight of at least one copolymerizable monomer selected from the class consisting of vinyl aromatic monomers, alkyl methacrylates having up to about 4 carbon atoms in the alkyl group, and acrylonitrile; and (d) from about 10 percent to about 86 percent by weight of at least one monomer selected from the class consisting of alkyl acrylates having up to about 10 carbon atoms in the alkyl group, alkyl methacrylates having from about 8 to about 12 carbon atoms in the alkyl group, and dialkyl esters of alpha, beta-ethylenically unsaturated dicarboxylic acids having up to about 8 carbon atoms in the alkyl group, said interpolymer being characterized by having amido hydrogen atoms replaced by the structure:

where R and $R_1$ are each selected from the group consisting of hydrogen and lower alkyl radicals.

3. The metal article of claim 2 wherein the interpolymer is an interpolymer of acrylamide, an acrylic acid and styrene.

4. The metal article of claim 2 wherein the interpolymer is an interpolymer of acrylamide, an acrylic acid, styrene and ethyl acrylate.

5. The metal article of claim 2 wherein the interpolymer is an interpolymer of acrylamide, methyl methacrylate, ethyl acrylate, acrylonitrile and an acrylic acid.

6. The metal article of claim 2 wherein the interpolymer is an interpolymer of acrylamide, acrylonitrile, styrene, ethyl acrylate, and an acrylic acid.

7. The metal article of claim 1 wherein the methyl methacrylate lacquer is an interpolymer containing about 50 percent to 100 percent by weight of methyl methacrylate and about 0 percent to about 50 percent by weight of an alkyl ester of an unsaturated carboxylic acid containing from 1 to 2 carboxyl groups and said alkyl group containing from 2 to 18 carbon atoms.

8. The metal article of claim 7 wherein the said alkyl ester is lauryl methacrylate.

9. The metal article of claim 8 wherein the said methyl methacrylate lacquer is an interpolymer comprising about 90 parts by weight of methyl methacrylate and about 10 parts by weight of lauryl methacrylate.

10. A metal article having a hard, adherent, crack-resistant, multiple-layer coating comprising a layer of primer and a superimposed layer of a thermoplastic methyl methacrylate lacquer in adherent contact therewith, said primer having as its major resinous components (1) an interpolymer of (a) from about 2 percent to about 7 percent by weight of an acrylamide; (b) from about 2 percent to about 10 percent by weight of an acrylic acid; and (c) at least one other monomer having a $CH_2=C<$ group, said interpolymer being characterized by having amido hydrogen atoms replaced by the structure:

$$-\underset{|}{\overset{R}{C}}HOR_1$$

where R and $R_1$ are each selected from the group consisting of hydrogen and lower alkyl radicals; and (2) an adduct of a hydroxyl-containing polymer and a dicarboxylic acid anhydride, said adduct having an acid number in the range of about 20 to 200 and a hydroxyl value in the range of 40 to 200.

11. A metal article having a hard, adherent, crack-resistant, multiple-layer coating comprising a layer of primer and a superimposed layer of a thermoplastic methyl methacrylate lacquer in adherent contact therewith, said primer having as its major resinous components (1) an interpolymer of (a) from about 2 percent to about 7 percent by weight of an acrylamide; (b) from about 2 percent to about 10 percent by weight of an acrylic acid; (c) from about 10 percent to about 80 percent by weight of at least one copolymerizable monomer selected from the class consisting of vinyl aromatic monomers, alkyl methacrylates having up to about 4 carbon atoms in the alkyl group, and acrylonitrile; and (d) from about 10 percent to about 86 percent by weight of at least one monomer selected from the class consisting of alkyl acrylates having up to about 10 carbon atoms in the alkyl group, alkyl methacrylates having from about 8 to about 12 carbon atoms in the alkyl group, and dialkyl esters of alpha, beta-ethylenically unsaturated dicarboxylic acids having up to about 8 carbon atoms in the alkyl groups, said interpolymer being characterized by having amido hydrogen atoms replaced by the structure:

$$-\underset{|}{\overset{R}{C}}HOR_1$$

where R and $R_1$ are each selected from the group consisting of hydrogen and lower alkyl radicals; and (2) an adduct of a hydroxyl-containing polymer and a dicarboxylic acid anhydride, said adduct having an acid number in the range of about 20 to 200 and a hydroxyl value in the range of 40 to 200.

12. The metal article of claim 11 wherein the said adduct is an adduct of a copolymer of allyl alcohol and styrene and maleic anhydride.

References Cited

UNITED STATES PATENTS

| | | | |
|---|---|---|---|
| 2,873,210 | 2/1959 | Barrett et al. | 175—75 |
| 2,940,943 | 6/1960 | Christenson et al. | |
| 2,940,945 | 6/1960 | Christenson et al. | |
| 2,949,383 | 8/1960 | Blake | 117—75 X |
| 2,956,902 | 10/1960 | Greif | 117—75 |
| 3,276,905 | 10/1966 | Porter | 117—73 |

RALPH S. KENDALL, *Primary Examiner.*